United States Patent [19]
Norton

[11] Patent Number: 5,311,203
[45] Date of Patent: May 10, 1994

[54] VIEWING AND DISPLAY APPARATUS

[76] Inventor: M. Kent Norton, 18700 Blythswood Dr., Los Gatos, Calif. 95030

[21] Appl. No.: 11,272

[22] Filed: Jan. 29, 1993

[51] Int. Cl.$^5$ .............................................. G09G 3/02
[52] U.S. Cl. ................................... 345/7; 33/355 R; 345/8; 434/289
[58] Field of Search ................ 33/1 CC, 1 SC, 355 R, 33/268; 434/287, 289; 340/705; 395/135; 345/7-9

[56] References Cited

U.S. PATENT DOCUMENTS

| | | | |
|---|---|---|---|
| 2,754,597 | 7/1956 | Sylvester | 434/289 X |
| 2,994,971 | 8/1961 | Meisenheimer et al. | 434/289 |
| 3,840,726 | 10/1974 | Harrison | 33/355 X |
| 4,930,888 | 6/1990 | Freisleben et al. | 340/705 X |
| 5,133,050 | 7/1992 | George et al. | 34/705 X |

FOREIGN PATENT DOCUMENTS 0226787  10/1991  Japan ................................... 340/705

*Primary Examiner*—Ulysses Weldon
*Attorney, Agent, or Firm*—Elliot B. Aronson

[57] ABSTRACT

A compact hand-held viewing apparatus that automatically determines the three-dimensional direction in which it is pointing and automatically presents information to the user related to features which are visible in the field of view of the apparatus in that three-dimensional direction. Any given embodiment of the invention is intended to be used for viewing a predetermined subject matter, such as astronomical features of the night sky or geographical features of the distant terrain. Included within the apparatus is a database with data about the predetermined subject matter correlated with three-dimensional direction. The apparatus is configured to provide data from the database in real time to the user as the user observes the field of view in a selected three-dimensional direction. If the user points the apparatus in a different three-dimensional direction, the direction-sensing mechanism determines the new direction, and the apparatus updates the data presented to the user to correspond to the new direction. The illustrated apparatus includes a visual display mechanism which presents data from the database to the user in the form of a visual reference display superimposed on the field of view so that the user may observe the actual view and the reference display at the same time. The image or text displayed in the reference display depends on the three-dimensional direction in which the apparatus is pointing. The apparatus includes appropriate processing circuitry for processing the three-dimensional directional data from the sensing mechanism and updating the reference display.

16 Claims, 5 Drawing Sheets

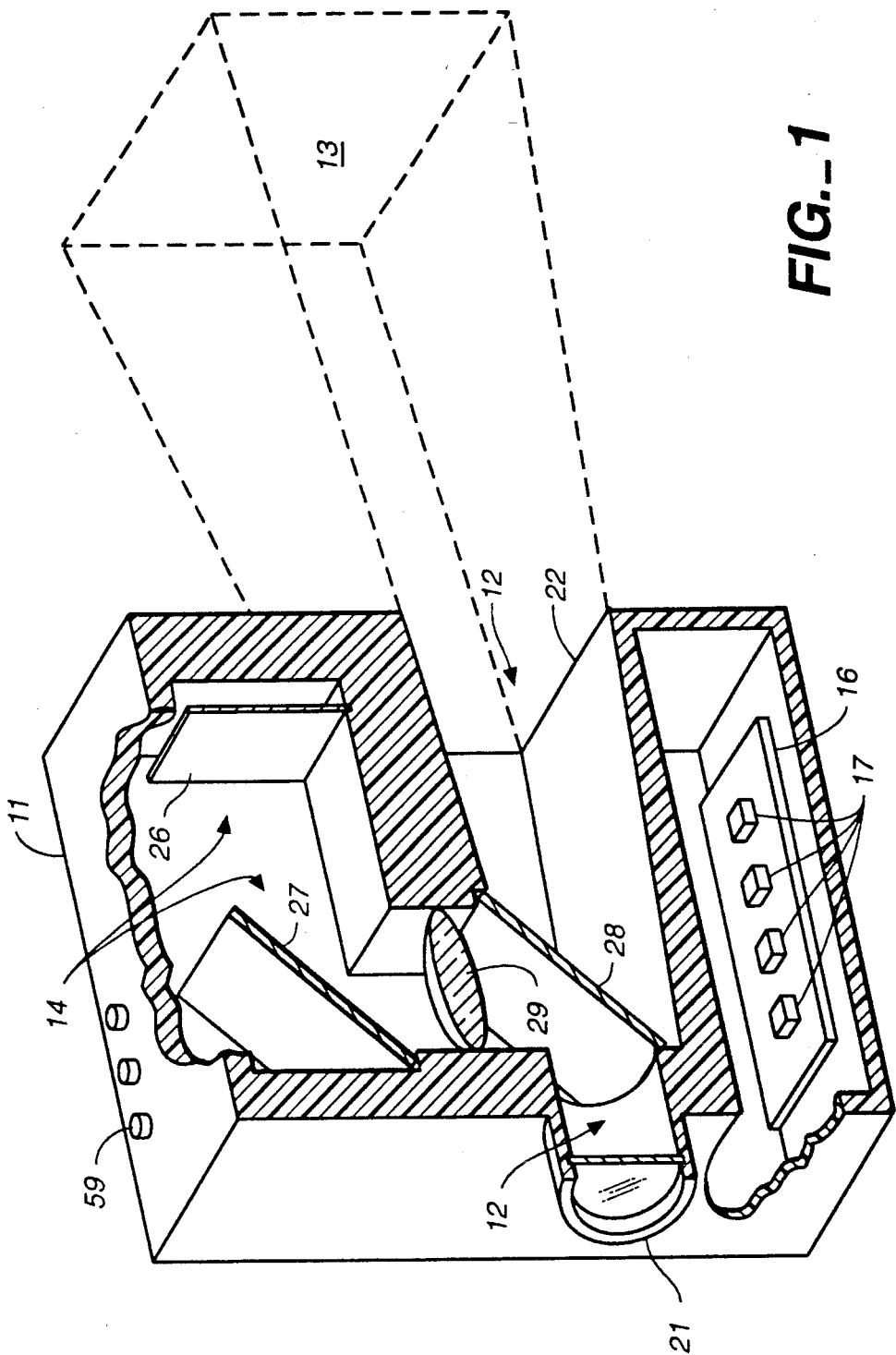
FIG._1

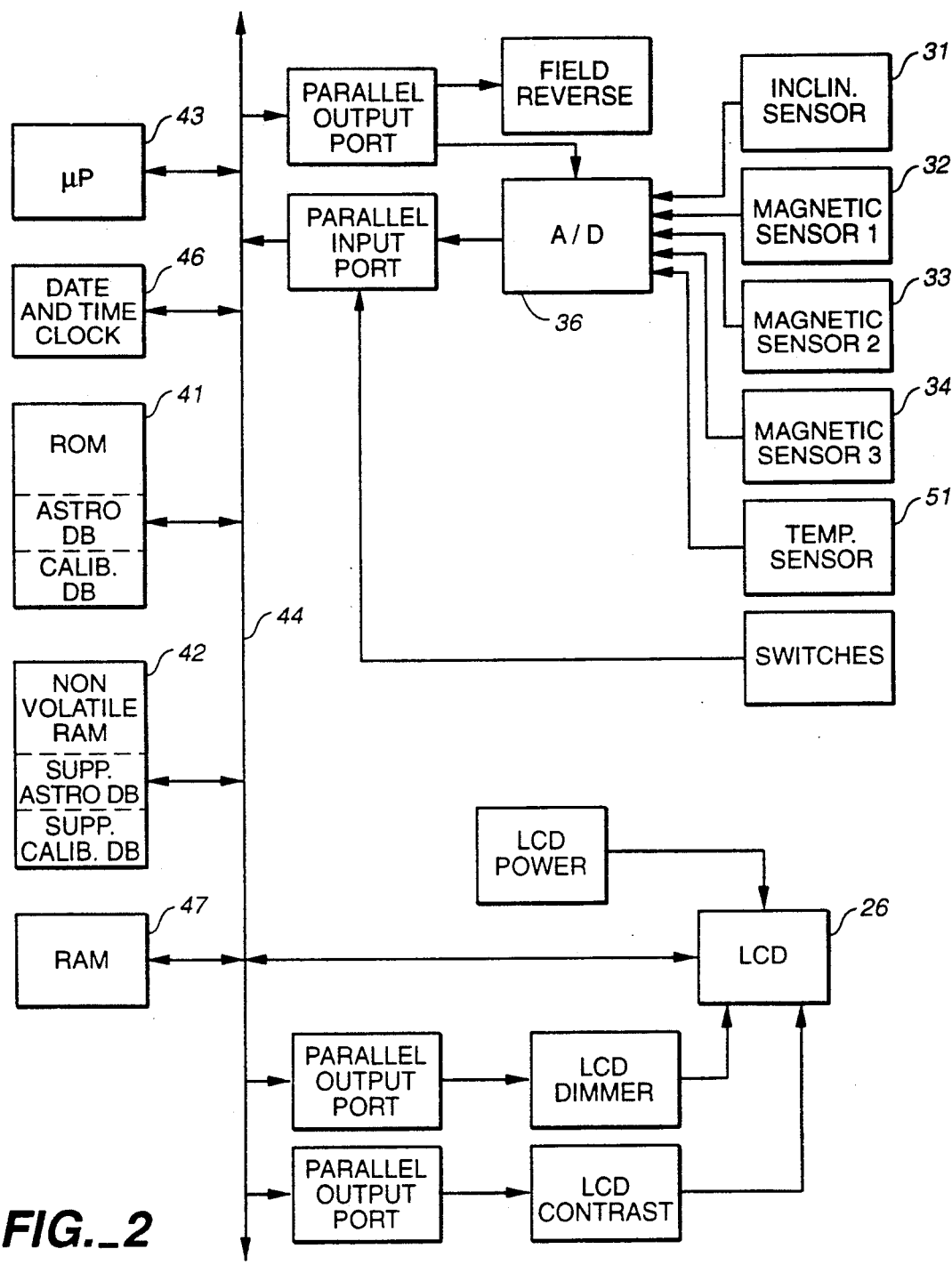
FIG._2

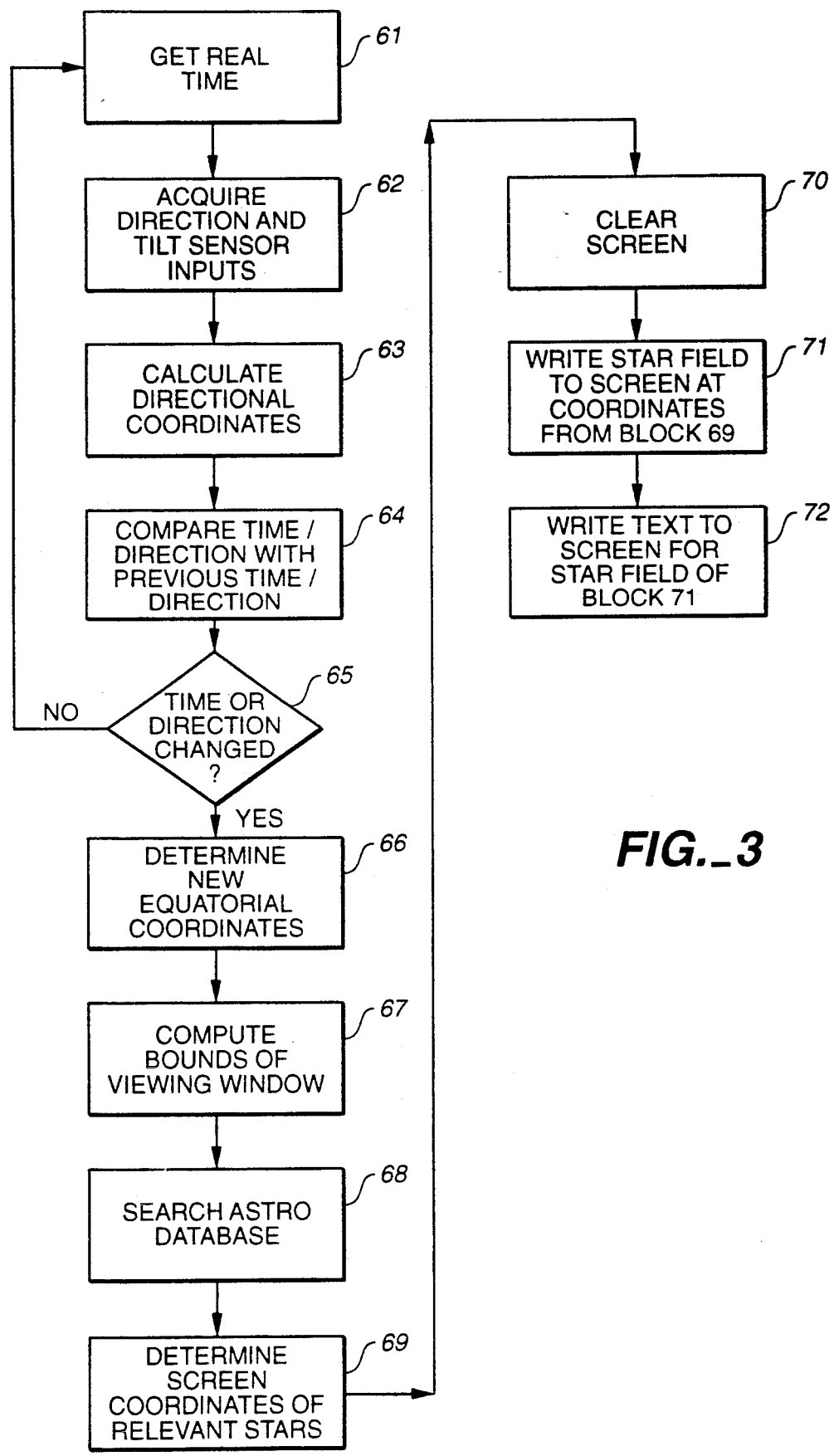
FIG._3

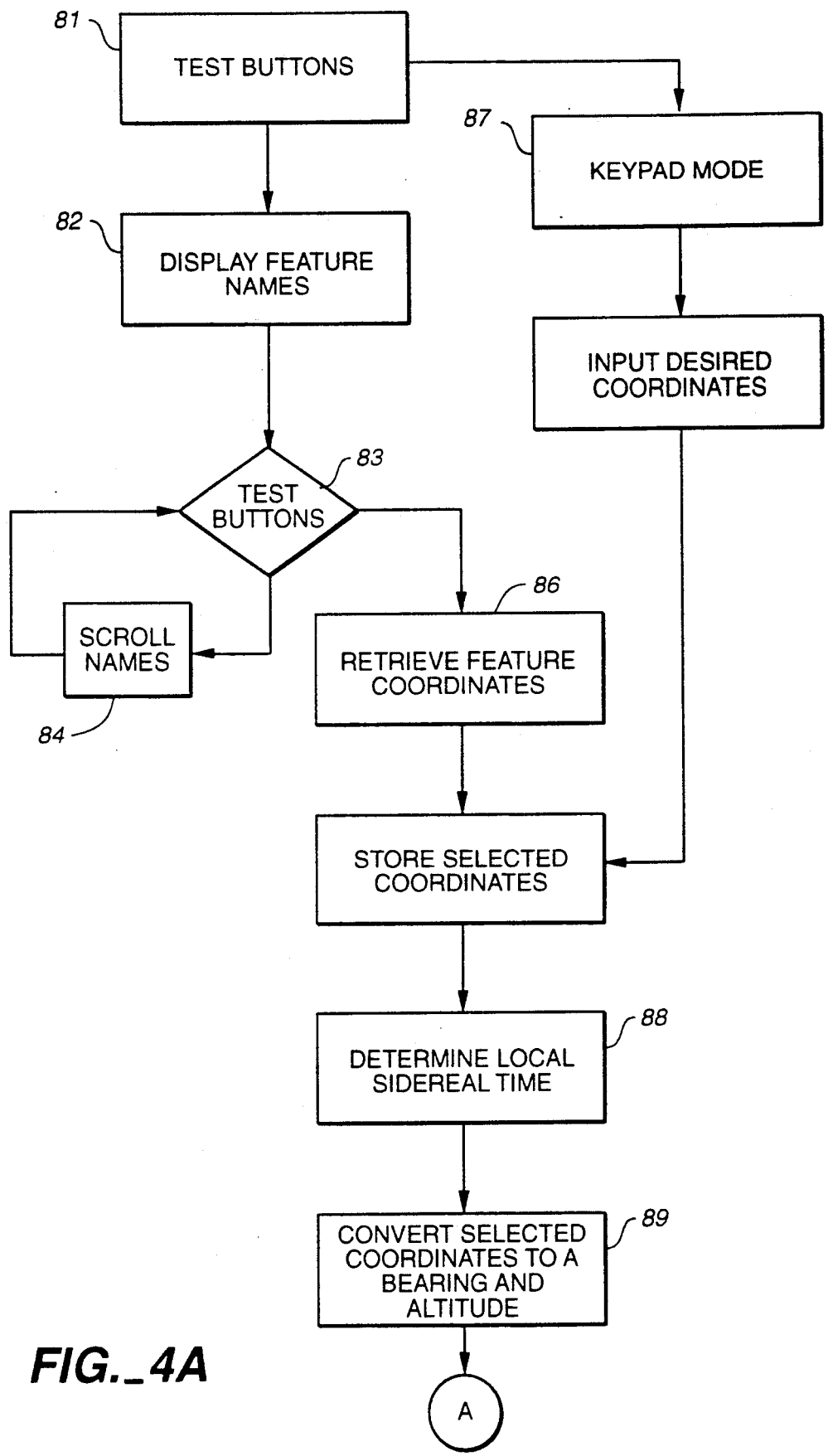
FIG._4A

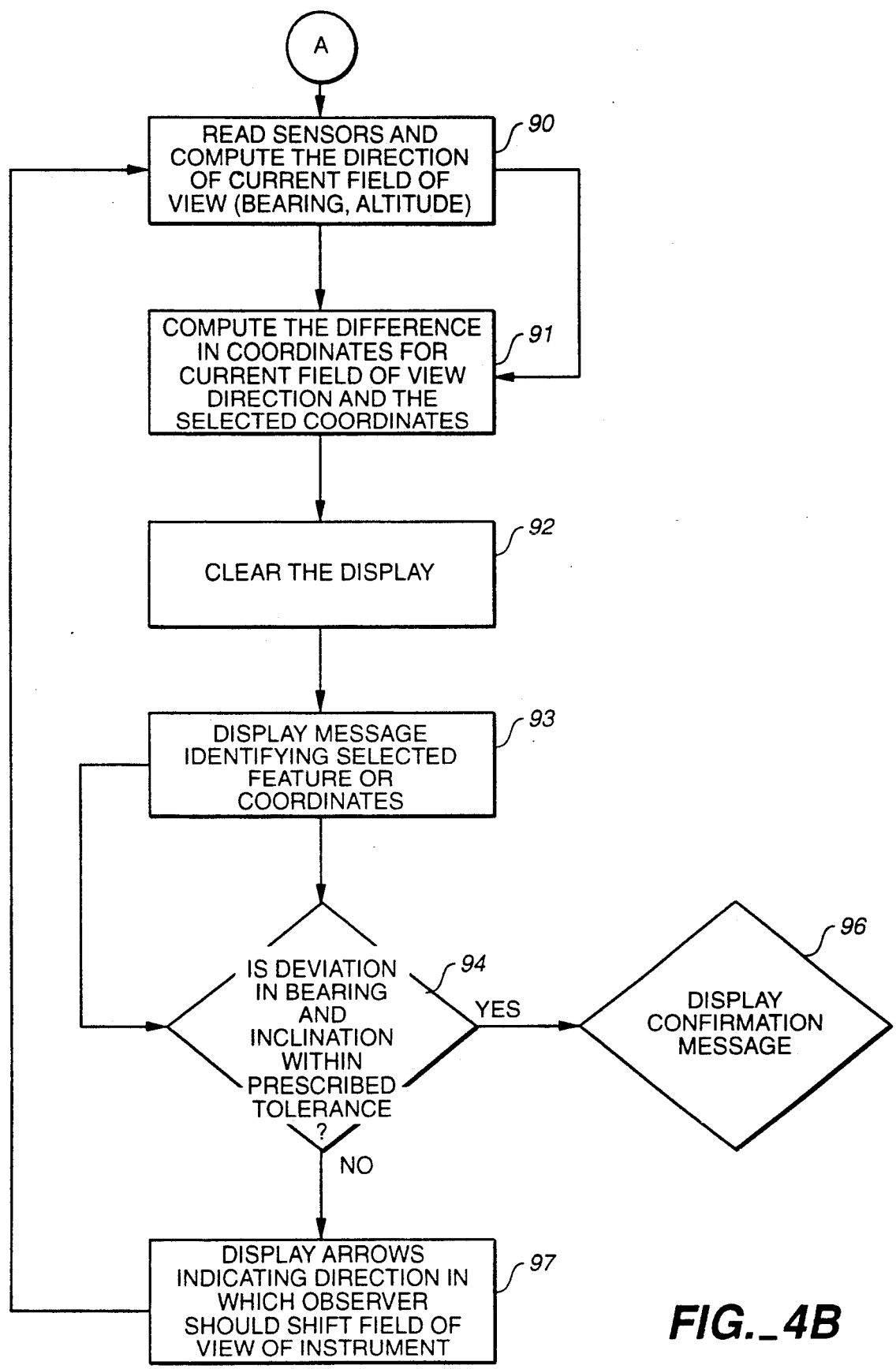
FIG._4B

VIEWING AND DISPLAY APPARATUS

BACKGROUND OF THE INVENTION

The present invention relates to apparatus for observing, locating and identifying features of interest in an observed field of view such as might be used, for example, in observing, locating and identifying stars or stellar constellations in an observed portion of the night sky.

Amateur astronomers interested in observing a stellar constellation or other feature in the night sky commonly use star charts to determine where to look to find the desired constellation or to identify what they are looking at. Such star charts give pictorial representations of stars and stellar constellations and sometimes indicate celestial coordinates by which the stars may be located. The amateur astronomer typically looks for the pattern of the constellation amongst the many stars in the sky, or if a single star, galaxy or other small feature is sought, the observer looks for the closest identifiable constellation and attempts to locate the desired feature within the pattern of the constellation. Alternatively, the observer may translate the coordinates of a desired feature from a star chart into compass bearing and elevation and then using a compass look in that direction. This approach has the disadvantages that it requires a degree of sophistication to know how to read a star chart, and it is difficult for most observers to aim a telescope, binoculars or the un-aided eye in a precise three-dimensional direction. The observer usually has to refer back and forth from the sky to the star chart. Separate illumination is usually needed to read the star chart in the field, and this presents a problem of the user's eye having to adjust to the vastly differing light levels of the night sky and the illuminated chart. In addition, a very limited amount of information may displayed on the star chart without making the chart unduly difficult to read.

SUMMARY OF THE INVENTION

The present invention provides a compact handheld viewing apparatus that automatically determines the three-dimensional direction in which it is pointing and automatically presents information to the user related to features which are visible in the field of view of the apparatus in that three-dimensional direction.

Briefly, apparatus according to the invention provides a housing which includes a means for defining the field of view that the user sees and a direction-sensing mechanism which senses the three-dimensional direction in which the device is pointed. Any given embodiment of the invention is intended to be used for viewing a predetermined subject matter, such as astronomical features of the night sky or geographical features of the distant terrain. Included within the device is a database with data about the predetermined subject matter, which data are correlated with three-dimensional directions. The apparatus is configured to provide data from the database in real time to the user as the user observes the field of view in a selected three-dimensional direction. If the user points the apparatus in a different three-dimensional direction, the direction-sensing mechanism determines the new direction, and the apparatus updates the data presented to the user to correspond to the new direction.

In a preferred embodiment of the invention, the apparatus includes a visual display mechanism which superimposes a reference display on the field of view. The reference displays are generated from data in the database and correspond to the direction in which the device is pointed. The apparatus includes appropriate processing circuitry which processes the three-dimensional directional data from the sensing mechanism and which controls and coordinates the display mechanism and reference displays.

The invention is particularly applicable to astronomical observation, where the reference displays may identify stars or other features of interest that the observer may see in the night sky. In one embodiment adapted for astronomical observation, for example, the user merely points the apparatus at the night sky in a direction of interest and looks through the viewing portion. The apparatus automatically determines the direction in which the user is looking and automatically coordinates that direction with the time and date as well as latitude and longitude at the user's location to determine which features of interest are visible in that portion of the sky at that hour of the night. The apparatus automatically superimposes on the observed night sky within the instrument's field of view an image in the form of a graphic representation of a prominent astronomical feature such as a constellation. In this mode the apparatus may also display labels for prominent stars or other features to identify the stars or features to the user or to assure the user that he or she is associating the correct name with the object being observed.

In another embodiment the user selects an asterism desired to be observed and the apparatus overlays the image of directional indicators on the field of view to prompt the user to point the apparatus in the direction of the selected asterism. In this mode, which may be called the "finder" mode, the image of arrows may be displayed and dynamically updated as the user moves the apparatus until the selected asterism is located. In yet another embodiment the apparatus performs the function of a sextant. In the sextant mode the user points the apparatus at a known star or more general asterism and aligns a reference image of that star or asterism with the observed configuration. The apparatus then displays the user's latitude and longitude.

Other aspects, advantages, and novel features of the invention are described below or will be readily apparent to those skilled in the art from the following specifications and drawings of an illustrative embodiment.

BRIEF DESCRIPTION OF THE DRAWINGS

FIG. 1 is a cut-away perspective view of apparatus according to the invention.

FIG. 2 is a system block diagram showing electronics control and data acquisition circuitry of an embodiment of the invention.

FIG. 3 is a functional flow chart for practicing a first mode of operation of the invention.

FIG. 4, composed of FIGS. 4A and 4B, is a functional flow chart for practicing a second mode of operation of the invention.

DETAILED DESCRIPTION OF ILLUSTRATIVE EMBODIMENTS

The invention is described here in an embodiment adapted for use in observing astronomical features in the night sky. The invention may also be used in applications other than astronomical observation, however, and is thus not to be limited to the specific astronomical embodiment disclosed here, which is offered only by way of example.

FIG. 1 shows an overall perspective view of apparatus according to the invention in which the housing 11 is partially cut away to reveal an optical arrangement, indicated generally at 12, for defining the field of view 13 of the apparatus, and an overlay arrangement, indicated generally at 14, for overlaying or superimposing a reference display on that field of view. In the astronomical application illustrated here, the reference display generally shows an astronomical feature of interest within the field of view, for example, a stellar constellation, a galaxy and its characteristic background star field, or a prominent star. The reference display may also include textual labels identifying features of interest. Thus, as used herein, "reference display" encompasses textual matter as well as graphic displays, as appropriate in context. Also visible in FIG. 1 is a printed circuit board 16, which includes the system electronics and a sensing mechanism, indicated diagrammatically at 17, for sensing the three-dimensional direction in which field of view 13 is aimed.

The optical arrangement defining the field of view of the device is provided in FIG. 1 by a view port 21 and a field stop 22. Field stop 22 is defined here by the shape of housing 11 itself around the exit viewing aperture at the front of the device, although other stop arrangements may also be used. The transverse dimensions and disposition of field stop 22 are chosen to define a field of view of convenient size. For example, a field of view with a 10 to 15 degree half-angle has been found to be convenient for viewing most astronomical objects of general interest. In other embodiments of the invention, the optical arrangement may also include further means for magnifying the objects in the field of view in the manner of conventional binoculars or small telescopes. The optics of such alternative arrangements are well known and may readily be implemented with the present invention by those skilled in the art.

The overlay arrangement 14 for superimposing the reference display on the field of view comprises a two-dimensional display means 26, a re-directing mirror 27, a beam splitter 28, and a focusing lens 29. Display means 26 may be provided by a flat liquid-crystal display (LCD), although plasma displays or other types of displays could also be used to implement the invention. Beam splitter 28 is inserted between view port 21 and field stop 22 at a nominal 45 degree angle to the optical axis of the view port and field stop. Although conventionally known as a beam "splitter," in the present configuration the component actually operates in reverse as a beam "joiner" to combine light from display means 26 and from field of view 13 along a common path to the user's eye at view port 21, thereby to form the overlaid display. Focusing lens 29 is interposed between the display means and the beam splitter along an optical axis perpendicular to the optical axis of the view port and field stop. Lens 29 serves to place the reference display from the display means at infinity. This makes the apparent direction and distance of the reference display to the observer coincident with the viewing direction of the device and distance to the observed celestial sphere. The relative distances, sizes, and angles of these components are selected so that the reference image on the display means appears on the same scale as the actual objects in the field of view.

When display means 26 is provided by a liquid-crystal display, beam splitter 28 should preferably be formed with a metalized coating. The reason is that liquid-crystal displays produce polarized light, and a beam splitter with a dielectric coating tends to selectively extinguish one component of the polarization, resulting in a lower-intensity reference display. The metalized coating avoids this effect and helps to maintain the intensity of the reference display.

In the display means arrangement just described the scene under observation in the instrument's field of view is in the user's direct line of sight and so, passes along a direct optical path to the user without reflection. The reference display, on the other hand, is reflected twice before the user views it, with a potential loss of image intensity at each reflection. As mentioned above, where an LCD display is used, special arrangements must be made to counteract losses due to selective extinguishment of polarized light from the LCD upon reflection by beam splitter 28. As an alternative embodiment the instrument may be configured so that the LCD (or other) display is placed in the user's line of sight for direct viewing, and the scene under observation follows the circuitous optical path to the user's eye. In this way the polarized light from the LCD is not subjected to any polarization-extinguishing reflections. While this arrangement may lead to a higher-contrast reference image, the scene under observation may appear less natural, and thus less appealing, to the user because it is viewed only indirectly. Thus, this embodiment may be less desirable in applications where the psychological response of the user is important.

Direction-sensing mechanism 17 includes an inclination sensor 31 for sensing the inclination of the line of sight of the instrument to the horizontal and three orthogonal magnetic sensors 32–34 for sensing the orientation of the instrument with respect to the local magnetic field of the earth. (See FIG. 2.) A suitable inclination sensor may be provided by commercially available inclinometers. For example, in the embodiment described here the inclination sensor is provided by a potentiometer-type inclinometer. This type of inclinometer includes a potentiometer having an eccentrically weighted shaft for varying the potentiometer resistance. The shaft tends to seek a resting position with the eccentric weight on the bottom. The potentiometer is mounted with the shaft axis of rotation perpendicular to the instrument and lying in the horizontal plane. As the inclination of the instrument is changed, i.e., as the line of sight is raised or lowered, the shaft rotates under the pull of the eccentric weight and causes the resistance to vary and the voltage across the wiper of the potentiometer to vary commensurately. Thus, the voltage output of the potentiometer is proportional to, and provides a measure of, the inclination of the line of sight to the horizontal. The voltage output is passed to an A/D converter 36 and stored in digital form for later calculation of the angle of inclination. The transformation of the potentiometer output voltage to angle is well known and need not be described here. Other arrangements may also be used for providing the inclination data in a form the microprocessor can use such as voltage-to-frequency converters or counter/timer combinations. Such alternative data acquisition arrangements are equivalent for the purposes of the present invention although they may involve different tradeoffs of power and cost in a practical implementation.

Magnetic sensors 32–34 may be conveniently provided by magnetoresistors. A magnetoresistor is a device whose resistance depends on the strength of the magnetic field in the sensitive direction of the device. Three such magnetoresistors are aligned in such a way that they are sensitive to the three perpendicular components of the earth's magnetic field. The voltage outputs of these magnetoresistors are converted to a compass bearing angle, which is stored for later use. While two magnetic field readings (hence only two magnetoresistors) might suffice to determine compass bearing, three are used here to provide an independent check on the self-consistency of the readings. The transformation of the magnetoresistor output voltages to bearing angle is well known and need not be described here. For operation of the invention, it is important that the compass bearing of the line of sight of the instrument automatically be determined and provided to the system electronics for processing. The compass bearing may be measured in a number of ways without departing from the invention. For example, an alternative implementation can be provided with a gimbal and two, or even only one, magnetoresistor. Those skilled in the art will recognize that other devices, such as Hall effect devices, flux gate magnetometers or gyrocompasses may also be used to measure the bearing angle.

The manner in which the reference displays are generated may be understood with reference to FIG. 2. The reference displays are provided to LCD 26 of overlay assembly 14 by a reference-generating means that automatically provides an appropriate display corresponding to the direction sensed by the direction-sensing mechanism. In the illustrated embodiment the reference-generating means is provided by a database contained in the ROM 41 and non-volatile RAM 42 together with a microprocessor 43 and appropriate software, an example of which is described below. With this arrangement a user aiming the device at a portion of the night sky will simultaneously and automatically see the portion of the night sky within the field of view of the device and an overlaid reference display corresponding to the field of view.

Microprocessor 43 communicates with the other components over address/data bus 44. Connected to bus 44 is real-time date and time clock 46, which provides data and time information used in determining the astronomical coordinates of the direction of view, as will be explained in more detail below. ROM 41 also holds the program code for the microprocessor 43. A separate RAM 47 is coupled to bus 44 for use by the microprocessor during execution of the program code.

The embodiment disclosed here includes two databases, which are referred to as the astronomical database and the calibration database. Each of these databases has two portions—a fixed portion and a supplementary portion. The fixed portion of each database is contained in ROM 41 and the supplementary portion is contained in non-volatile RAM 42. The fixed astronomical database includes entries for stellar objects, etc, the coordinates of which will not change significantly over the life of the apparatus. The supplementary astronomical database may be updated from time to time. It contains such entries as planets, comets, and planetary moons, the positions of which may vary visibly from observation to observation. In other words, the entries in the supplementary astronomical database have to be updated from time to time whereas those of the fixed database do not. A database entry may include such information as the equatorial coordinates of the object, its apparent magnitude, and a label for the object. Moving objects such as planets exhibiting their own trajectories across the night sky may be located by a computational scheme. The fixed astronomical database in ROM 41 includes characteristic parameters of the planetary orbit along with well known algorithms for calculating planetary orbits. The algorithms provide, for example, the right ascension and declination of the planet against the celestial sphere, which are calculated when the instrument is first turned for the date and time provided by clock 46. The results of the calculation are recorded in RAM 42. The planetary position information may be updated at any time simply by momentarily turning off the instrument and turning it back on. Alternatively, the instrument may be provided with an update button sending a command to the microprocessor to perform the orbital calculations again. In yet another embodiment the instrument may keep track of the elapsed time since the planetary positions were calculated and update the position information stored in RAM 42 at prescribed intervals. Although a particular computational arrangement is described here for illustration, those skilled in the art will appreciate that planetary positions and the like may alternatively be provided by a lookup table arrangement. The memory demands of a lookup table may be appreciably reduced by use of an interpolation scheme.

The fixed calibration database is also maintained in ROM 41 and contains entries specific to the transducers of the instrument and may also contain site-specific calibration information such as the local longitude, latitude, magnetic deviation, and optionally time zone at the geographic location where the instrument is most likely to be used. The supplementary calibration database contains user-modifiable entries, e.g., for alternative geographic location parameters, providing an alternative calibration database to be used when the user goes to another location significantly different from the base location specified in the fixed portion of the calibration database. The supplementary calibration database may also contain offset entries for fine-tuning the instrument calibration. For example, a menu of offset parameters may be presented to the user, by which the user may select alternative base latitude and longitude, or may adjust the local magnetic deviation, or may make other similar adjustments.

Microprocessor 43 controls and reads the multiplexed analog-to-digital converter 36, which receives data from the sensors along several channels. By controlling which channel is read, microprocessor 43 determines the voltage outputs of the plurality of sensors by which the apparatus senses its orientation. This information is then used in conjunction with the real-time clock 46 to determine the celestial coordinates for the center of the field of view of the device. Once those coordinates have been determined, the field of view for that viewing orientation is then known. The database is then searched for all stellar objects within that field of view. The coordinates of those stellar objects are converted to a coordinate position on LCD 26.

Apparatus according to the invention may be used in a wide range of temperatures and environmental conditions. Various parameters in the instrument are sensitive to temperature, such as the output voltage of the magnetoresistors or the contrast of the LCD display or the resistance of the potentiometer used in the inclination sensor. To make the instrument more stable and hence more accurate over the temperature range in which it is expected to be used, the instrument includes a temperature transducer 51 for providing temperature corrections to the other transducers or any other electronic components which are sensitive to temperature. Such temperature transducers are well known and take many forms, such as thermocouples, thermistors, or silicon temperature sensitive elements. The principles of operation of temperature transducers are well known to those skilled in the art and need not be described in detail here. Some corrections may be applied by the software, while others may require a change in basis voltage to remove the temperature dependence.

To enhance the sensitivity, the microprocessor outputs a signal which reverses the bias on the magnetic sensors at a regular interval improving the signal to noise ratio. The switch(es) provide a means to change the mode of operation of the device, or to update local calibration constants, and/or to recalibrate the device, or to select coordinates or objects of interest.

A description is now given of the software routines governing the operation of microprocessor 43. When the power is first turned on, the hardware (e.g., RAM, ROM, interrupts, and serial ports) is initialized as appropriate for the particular hardware implementation. This is a standard procedure, the details of which depend on the particular choice of hardware components.

Next the instrument is calibrated. A software subroutine causes microprocessor 43 to read the calibration constants for the sensors from the fixed and supplemental calibration databases in ROMs 41 and 42. These calibration constants will generally include such parameters as latitude and longitude of the location where the instrument is to be used and the mathematical relationship between voltage output of the direction-sensing transducers and inclination angle or magnetic field strength.

The local sidereal time is then computed. A software subroutine causes microprocessor 43 to read clock 46, which is set to a standard time such as Greenwich universal time. A further software subroutine converts the clock's standard Greenwich universal time to Greenwich sidereal time and then converts the Greenwich sidereal time to local sidereal time based on the longitude recorded in the calibration database for the viewing site at which the device is to be used.

At this stage, all the needed time information has been determined and stored for later reference. That is, the instrument starts with Greenwich mean time and ends up with local sidereal time, which is needed to determine the current local equatorial coordinates along the line of sight. The methods and mathematical relations for calculation of local sidereal time from Greenwich sidereal time and for calculation of Greenwich sidereal time from Greenwich universal time, indeed, the conversion from one time system to another using the local latitude and longitude, are well known in astronomy and navigation and need not be described here. The microprocessor next determines the coordinates of the horizon. A software subroutine reads the transducers 31–34 and calculates the angle of the line of sight to horizontal (i.e., the inclination) and the compass bearing of the direction in which the observer is looking. The subroutine converts the voltage output of the inclinometer 31 to an angle using the calibration constants from the calibration database. The angle so determined is stored for later use.

The same subroutine also reads the other transducers upon command from the microprocessor through multiplexed A/D converter 36 and converts the transducer voltage outputs to respective directional or physical quantities. The voltage outputs of magnetoresistors 32–34, in conjunction with the calibration constants from the calibration database, are converted to a compass bearing, which is stored for later use. While two magnetic field readings (hence only two magnetoresistors) would suffice, the use of three mutually orthogonal readings provides greater accuracy because with three magnetoresistors oriented in three mutually orthogonal directions, one of the three magnetoresistors will generally be oriented in a direction that is more sensitive to the Earth's magnetic field. Alternative transducer implementations can be provided with a gimble and two, or optionally only one, magnetoresistor. Other devices, such as Hall effect devices or flux gate magnetometers or gyrocompasses, may also be used in place of a configuration of magnetoresistors.

Similarly, temperature transducer 51 is read on command by the microprocessor and its output voltage converted to a temperature reading by an appropriate software subroutine.

Thus, the result of the transducer-reading subroutine is an inclination or altitude (i.e., angle to the horizontal) and a bearing (i.e., angle in the horizontal with respect to true North) which have been corrected for any temperature dependence inherent in the transducers and for any local magnetic field deviation.

Having determined and stored the local sidereal time and directional coordinates of the instrument (the compass bearing to the horizon and the inclination), microprocessor 43 undertakes the determination of the overlay display. This determination is made in a sequence of steps referred to as the loop test and described with reference to FIG. 3. This test may be performed in a continually repeating loop or alternatively may be performed only on command from the user. If the test is performed in a continuous loop, the instrument will automatically update the overlay display as the instrument is pointed in different directions. Alternatively, the instrument may be configured with a screen update button 59 by which the user may command the microprocessor to repeat the test and refresh the screen. Update button 59 is a push-button switch providing a contact input which interrupts the microprocessor and causes it to begin the loop test (at block 61 of FIG. 3). In one embodiment the display screen may be updated only by depressing update button 59 and no automatically repeating loop is provided.

Microprocessor 43 begins each loop repetition by determining whether the instrument has been moved significantly or whether significant time has elapsed since the previous loop repetition. At blocks 61–64 the microprocessor determines the present time and instrument directional coordinates and compares them with the previous values to determine whether the values have changed beyond pre-set limits. The pre-set limits establish the tolerable variations within which the display need not be updated. For example, in the astronomical embodiment described here the positions of the stars change so slowly that they may be considered fixed over a period at least on the order of several minutes that a user would typically view the display. The pre-set limit on time variations may thus conveniently be set to a time at least on the order of several minutes to one-half hour. The pre-set limits on directional variations must similarly allow for small movements of the apparatus as the user attempts to hold it by hand in a stationary viewing position. In the continuous loop embodiment if the new directional values have not changed significantly, then the loop returns to block 61 to determine the time and direction again and repeat the comparison, as indicated at block 65. Alternatively, in a user-commanded update embodiment the test does not begin anew at block 61 until the user depresses the update button causing the microprocessor to go to block 61. Those skilled in the art will recognize that the loop test and display updating may alternatively be configured in other ways as well in which various of the measurements and computations indicated in FIG. 3 are performed continuously in the background while the display is not updated until so commanded via the update button. In any case, if the new values of the time or directional coordinates have changed beyond the preset limits, then the microprocessor proceeds to update the reference display as shown at blocks 66–72.

To update the reference display, a subroutine first converts the new local sidereal time and the bearing and inclination to equatorial coordinates and stores them for later reference. See block 66. Algorithms for converting local sidereal time, bearing and inclination to equatorial coordinates are well known and need not be described here.

At block 67 another subroutine determines the bounds of the viewing window that the user sees, that is, the reach of the viewing window against the night sky. The equatorial coordinates calculated at block 66 are taken as the center of the viewing window, and the subroutine at block 67 determines, for example, the equatorial coordinates of the corners and/or midpoints of the viewing window boundaries. The window boundary coordinates depend on the geometrical and optical arrangement of the viewing portion in any given embodiment of the apparatus. Calculating these coordinates is straightforward and within the ordinary skill in the art for a given embodiment. The microprocessor then goes on at block 68 to search the astronomical database for all stars having coordinates within the window boundaries. Other, preselected criteria may also be applied to limit the database search of block 68. For example, a menu may be provided at the beginning of the viewing session through which the user may select to see stars only above a certain magnitude. The stars or stellar objects found in the search are stored in a temporary array in RAM 47 for use later. The temporary array thus contains all the stars or stellar objects relevant to the viewing window. The astronomical database in ROM 41 or RAM 42 contains the equatorial coordinates of all the objects in the array. Another routine indicated at block 69 then converts the equatorial coordinates of each star or object in the temporary array to xy coordinates locating the object on LCD display 26. Converting the coordinates of only those objects in the temporary array serves to reduce computation time, making for a faster display to the user.

As indicated at block 70, the microprocessor then clears the screen of the earlier display and, at block 71, causes the star pattern to appear on the display screen by sending electrical signals to activate LCD 26 at the xy coordinate positions determined at block 69. Thus, upon completion of block 71 the display screen shows a graphic representation of the relevant star field corresponding to the actual field of view seen in the viewing window.

At block 72 the microprocessor then adds test to the screen generated in block 71. The test may provide labels and/or instructional information about the displayed star field. For example, the text may list the equatorial coordinates (right ascension and declination) and the equivalent horizon coordinates of the center of the viewing field. It may also display the name of the star in the database which is closest to the center of the viewing field and may give the magnitude of that star along with its specific equatorial coordinates. In addition, it may be desirable to cause the named star to flash a predetermined number of times. The microprocessor may be programmed to return to block 61 either after a predetermined number of flashes has occurred or after a predetermined time has elapsed to begin the loop again and update the display if any significant change has occurred.

In another mode of operation of the invention, the device may be used to find an astronomical feature of interest in the night sky. In this mode, referred to as the "finder" mode, the user selects a feature of interest and then sights the device in any direction of the sky. Directional indicia such as one or more arrows are displayed indicating the direction in which the user should move the device to find the selected feature. This mode of operation is described with reference to the flow chart of FIG. 4.

In the finder mode the device must include a means by which the user may select a feature of interest. In the illustrated embodiment the device displays a menu permitting the user to select a named feature or alternatively permitting the user to enter coordinates of the desired feature. The user selects the "name" or "coordinate" mode and depending on the selection is presented with either a list of names or a coordinate entry screen. In the "name" mode the user may scroll or page through the list until the desired selection is highlighted. In the coordinate approach the coordinates are entered on a keypad or on a graphical representation of a keypad. In either case, the user then depresses the update button to indicate that the selection has been made. The activation of the selection menu and the scrolling, paging and highlighting functions are controlled with control buttons in a manner well known in the art and requiring no further description here.

The apparatus includes a plurality of control buttons or keys by which the user may make selections and update the view. Microprocessor 43 continually tests in background to see which if any buttons have been depressed as indicated at block 81 of FIG. 4A. If a first button has been selected, then at block 82 the microprocessor displays a list of feature names with one name highlighted, which the user may select. The microprocessor continues to scan for depressed buttons at block 83. If no button is depressed, indicating no selection has been made, the microprocessor continues to display the listed names at block 82. If the scroll button is depressed, the highlighted bar is scrolled over the list of names until a desired one is reached. If actuation of a selection button is detected, then the microprocessor goes to block 86 where it retrieves the coordinates of the selected feature from the database in ROM 41 or RAM 42.

The user may alternatively select a keypad mode, in which the user enters the coordinates of the desired feature. If the microprocessor detects at block 81 that the keypad mode has been selected, then it proceeds to block 87 and processes the keypad input in conventional manner. When the entry is complete, the system proceeds to block 86 where it retrieves the coordinates of the selected feature for use in the subsequent operations.

Once the microprocessor has obtained the coordinates of the selected feature at block 86 (or through the keypad mode at block 87), it stores the selected coordinates and proceeds to read the local date and time and determine the local sidereal time at block 88, as discussed above. At block 89 the system determines the bearing and inclination of the selected feature in conventional manner from the now known coordinates and sidereal time. As in the previously described mode, the system reads the directional sensors and computers the current bearing and inclination of the instrument field of view at block 90. Then, at block 91 the microprocessor computers the deviation of the bearing and inclination for the selected feature and the instrument field of view. As depicted in FIG. 4B the instrument then clears the screen and displays a message to the user identifying the selected feature. See blocks 92, 93. At block 94 the microprocessor compares the bearing and inclination deviations from block 91 with pre-set tolerance limits. If the deviations are small, i.e., fall within the prescribed tolerances, the instrument is pointing at the selected feature and a message to this effect is displayed to the user at block 96. If the deviations do not fall within the allowed tolerance, the system displays directional indicia, for example, in the form of arrows, indicating the direction in which the instrument should be moved to find the selected feature. See block 97. After a short delay for the instrument to be moved, or alternatively, after the user depresses an update button, the microprocessor returns to block 90 where it re-reads the directional sensors and begins the loop again.

While the above provides a disclosure of illustrative embodiments of the invention, various modifications, alternate constructions, and equivalents may also be employed to achieve the advantages of the invention. For example, the above embodiments all describe the visual display of graphical or textual information on the observable features of interest within the instrument field of view. However, certain data from the database may be provided to the user aurally with known speech synthesis integrated-circuit chips in place of the visual display. In this embodiment, for example, the user merely sights the instrument in a selected direction and on actuating the update button the instrument provides a spoken description of features of interest in the field of view, e.g., "The bright star is Betelgeuse in the constellation Orion." In other embodiments the invention may be implemented with different databases in place of the astronomical database described here. The invention may be implemented, for example, with a geographical database containing data on the local geographical terrain. By sighting the device in a particular direction, an image of the local terrain is displayed with geographical features of interest labeled. Thus, the invention is not to be limited to the above description and illustrations, but is defined by the appended claims.

What is claimed is:

1. A portable, hand-holdable viewing apparatus for use in viewing a predetermined subject, said apparatus having a field of view of a predetermined size and presenting information to the user about features of the subject visible in the field of view, comprising:

a hand-holdable housing, said housing containing:
 viewing means defining said field of view of predetermined size;
 a direction sensing mechanism for sensing a characteristic three-dimensional direction of said field of view;
 an electronic database containing data about the predetermined subject, the data being arranged in said database to be correlated with three-dimensional direction;
 output means for providing data from said database to a user; and
 microprocessor means responsive to said direction sensing mechanism and coupled to said database and to said output means to provide data about the subject to the user in real-time, the provided data being correlated with three-dimensional directions falling within said field of view of predetermined size;
 whereby the provided data is automatically and simultaneously presented to the user as the user observes the field of view in a selected three-dimensional direction.

2. The apparatus of claim 1 wherein said output means comprises a visual display means for providing said database data to the user as a reference display for real-time visual comparison with the observed field of view.

3. The apparatus of claim 2 wherein said reference display comprises textual data.

4. The apparatus of claim 2 wherein said reference display comprises a graphical image.

5. The apparatus of claim 2 wherein said output means further comprises an overlay means for superimposing said reference display on said observed field of view, said reference display being superimposed so as to appear at infinity.

6. The apparatus of claim 5, including means defining a first optical path for said observed field of view and a second optical path for said visual display means, and said overlay means comprises a beam splitter interposed in said first and second optical paths for directing said observed field of view and said reference display along a common optical path to the user.

7. The apparatus of claim 6 further including at least one reflective element in said second optical path for directing said reference display to the user.

8. The apparatus of claim 7 wherein said visual display means comprises a liquid crystal display and said reflective element includes a metalized reflective surface.

9. The apparatus of claim 1 wherein said direction sensing mechanism comprises at least two magnetic sensors for sensing orientation with respect to the earth's magnetic field and an inclination sensor for sensing the inclination of the apparatus line of sight to the horizontal.

10. The apparatus of claim 1 wherein said direction sensing mechanism comprises at least three mutually orthogonal magnetic sensors for sensing orientation with respect to the earth's magnetic field.

11. The apparatus of claim 10 wherein said direction sensing mechanism further comprises an inclination sensor for sensing the inclination of the apparatus to the horizontal.

12. The apparatus of claim 1, further comprising means providing sidereal time for determining said three-dimensional direction with respect to celestial coordinates.

13. The apparatus of claim 1, wherein said predetermined subject is dependent on the base location at which said apparatus is used, further comprising a second database containing latitude, longitude, and magnetic deviation of base locations for use of the apparatus.

14. A portable, hand-holdable viewing apparatus for use in viewing a predetermined subject, said apparatus having a field of view of a predetermined size and presenting information to the user about features of the subject visible in the field of view, comprising:
- a hand-holdable housing, said housing containing:
- viewing means defining said field of view of predetermined size and including a view port for the user;
- a direction sensing mechanism for sensing a characteristic three-dimensional direction of said field of view, said direction-sensing mechanism including:
  - an inclination sensor for sensing the inclination of the line of sight of said apparatus to the horizontal; and
  - at least two orthogonal magnetoresistors for sensing the orientation of the instrument with respect to the local magnetic field of the earth;
- non-volatile memory means having a database stored therein containing data about the predetermined subject, the data being arranged in said database to be correlated with three-dimensional direction;
- display means for providing a reference display of data from said database to a user;
- optical means for presenting said reference display to the user at said view port such that said reference display is overlaid on said observed field of view, said reference display being overlaid so as to appear at infinity;
- a microprocessor responsive to said direction sensing mechanism and coupled to said non-volatile memory means and to said display means to provide data from said database about the subject to the user in real-time, the provided data being correlated with three-dimensional directions falling within said field of view of predetermined size, whereby the provided data is automatically and simultaneously presented to the user as the user observes the field of view in a selected three-dimensional direction.

15. A method of providing information to a user about a predetermined subject with a hand-held viewing apparatus with which the user may view the predetermined subject comprising the steps of:
- providing an electronic database in said hand-held viewing apparatus containing data about the predetermined subject correlated with three-dimensional direction;
- providing means for sensing three-dimensional direction in said hand-held viewing apparatus;
- holding said hand-held viewing apparatus while pointing said viewing apparatus in a viewing direction;
- sensing said viewing direction with said three-dimensional direction sensing means and determining the three-dimensional coordinates of said viewing direction;
- searching said database for data correlated with three-dimensional directions within a prescribed range about the three-dimensional coordinates of said viewing direction; and
- providing data resulting from said searching step to the user, wherein said sensing, determining, searching, and data providing steps are performed contemporaneously with said holding and pointing steps, whereby said data are provided in real-time as the user observes the field of view of the apparatus in said viewing direction.

16. The method of claim 15 further comprising the step of visually displaying the data resulting from said search to the user overlaid on the field of view of said apparatus so as to appear at infinity in said viewing direction.

* * * * *